July 14, 1942.  W. H. NEELY  2,289,723
CLIP CONNECTION FOR SPRING SEAT STRUCTURES
Filed Jan. 18, 1939
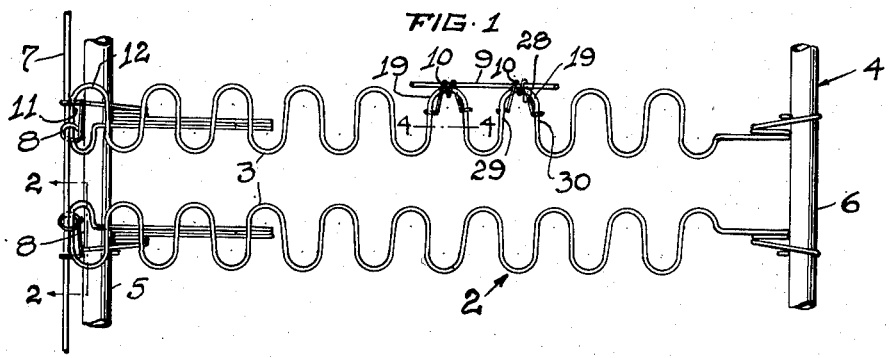
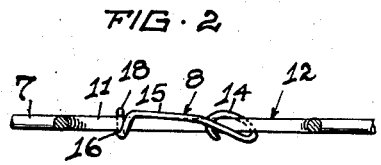
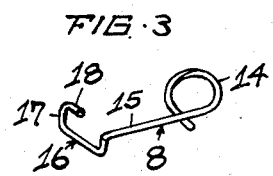
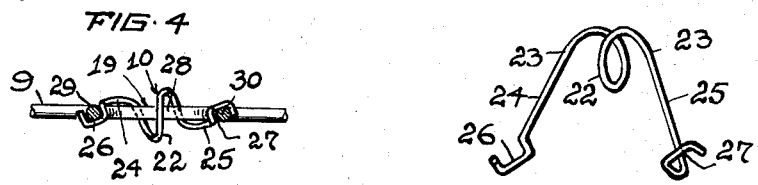
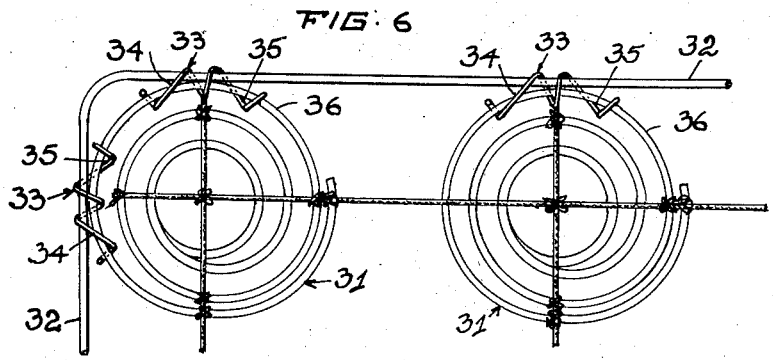
INVENTOR.
WILLIAM H. NEELY
BY Gustav A. Wolff
ATTORNEY.

Patented July 14, 1942

2,289,723

UNITED STATES PATENT OFFICE 2,289,723

CLIP CONNECTION FOR SPRING SEAT STRUCTURES

William H. Neely, Cleveland, Ohio, assignor, by mesne assignments, to John C. Lincoln, Scottsdale, Ariz.

Application January 18, 1939, Serial No. 251,521

2 Claims. (Cl. 155—179)

This invention relates in general to spring seat structures embodying a plurality of specifically constructed flat springs of sinuous or similar shape, which springs are arranged side by side across a frame and form a continuous, elevated seating portion above the frame. In these spring seat structures the elevated seating portion has its edge generally reenforced by an edge wire attached to and supported by all the springs, which edge wire prevents lateral movements of the springs and stiffens the edge of the seating portion so as to give said edge the desirable degree of rigidity and prevents sagging.

The attachment of an edge wire to springs heretofore has been made by sheet metal or wire clips which are clamped around the springs and wire by means of special tools. However, these clips easily open up when under stress, so that the life of spring seat structures embodying this type of clips is materially decreased. This deficiency of currently used clamping clips has partly been overcome by interlocking the ends of the clips with each other, however, this process is costly and necessitates use of expensive tools, dies and heavy machinery.

The general object of the present invention is the provision of a simple and economical wire clip with yielding self locking gripping action, which clip can readily and easily be attached to or detached from the connected element and which securely connects an edge wire or similar element to a spring or other wire member.

Another object of the invention is to provide a simple and economical wire clip embodying an open clamping coil member and integral lever tensioning means for said coil extending therefrom, the clamping coil being adapted to be slipped upon the elements to be coupled and the lever tensioning means effecting tight clamping action of the coil, when said lever tensioning means are forcibly engaged and interlocked with one of the coupled elements.

A further object of the invention is to provide a simple and economical wire clip embodying an open clamping coil and integral lever tensioning means extending from the ends of said coil in such relation with respect to each other that the clamping coil is tightened around the elements to be coupled when the lever tensioning means are forcibly engaged and interlocked with one of the coupled elements.

In addition the invention has certain other marked superiorities which radically distinguish it from presently known structures. These improvements or superior characteristics embodying certain novel features of construction are clearly set forth in the appended claims; and a preferred form of embodiment of the invention is hereinafter shown with reference to the accompanying drawing forming part of the specification.

In the drawing:

Fig. 1 is a fragmentary plan view of a spring seat structure embodying specifically constructed flat springs of sinuous shape, which springs are coupled with and support an edge wire by means of spring clips made in accordance with the invention.

Fig. 2 is a fragmentary, enlarged sectional view taken on line 2—2 of Fig. 1, showing a side view of one of the spring clips shown in Fig. 1.

Fig. 3 is a perspective view of the spring clip shown in Fig. 2.

Fig. 4 is another fragmentary, enlarged sectional view taken on line 4—4 of Fig. 1, showing a side view of another one of the spring clips shown in Fig. 1.

Fig. 5 is a perspective view of the spring clip shown in Fig. 4; and

Fig. 6 is a plan view of a spring structure embodying coiled springs coupled with a wire by means of spring clips according to the invention.

In the spring seat structure 2, fragmentarily illustrated in Fig. 1, a plurality of specifically constructed flat, sinuously shaped springs 3 are arranged crosswise of a frame 4 and supported in elevated position upon front and rear rails 5 and 6 of frame 4. These springs have attached to their front ends an edge wire 7, secured to said springs by spring clips 8, and, in addition, the sides of the spring seat structure have attached to the end springs edge wires 9, which wires are secured to the outer side of each of said end springs.

Spring clips 8, which couple edge wire 7 with the straight outer wires 11 of the last sinuous coils 12 of springs 3, are made of spring steel wire and each embodies an open wound clamping coil 14 having a single loop and an integral tensioning lever 15 extended from one end of coil 14 in slightly overlapping relation with respect to the other end of said coil. This lever 15 has its end portion downwardly and laterally offset to form a substantially U-shaped seat 16 which is preferably slightly angularly related to coil 14 for a purpose later to be described. The end portion 17 of U-shaped seat 16 is slightly bent inwardly, as at 18, to effect automatic locking of lever 15. Thus the slight inclination of coil 14 with respect to seat 16 causes automatic shifting of said lever to a position in which the inward bent portion 18 locks the lever when seat 16 is forcibly brought into engagement with the wire and the spring to be coupled with each other.

Spring clip 8, when used for attaching edge wire 7 to the straight outer wire 11 of one of the last sinuous coils of a spring 3, has its open coil 14 slipped upon edge wire 7 and wire 11, and then lever 15 is forced toward coil 14 until seat 16 on lever 15 is snapped into engagement with edge wire 7 and wire 11. In such a position coil 14 is fully closed as lever 15 contacts with the end portion of said coil and closes same, and coil 14 being tilted securely grips wires 7 and 11, while lever 15 is yieldingly forced into engagement with said wires. Lever 15 also has been shifted laterally, so that inward bent portion 18 on U-shaped seat 16 prohibits accidental release of seat 16 from wires 7 and 11. The lateral shifting of the lever is caused by the tilted relationship of coil 14 with respect to lever 15 and the tilting of coil 14 with respect to the wires 7 and 11.

The side edges of the spring seat structure 2, as stated above, are reenforced by edge wires 9 which are attached to and supported by the sinuous loops 19, spring clips 10 being used for such purpose. These clips are made of spring steel wire and each embodies a central, open-coiled clamping portion 22 consisting of a coil of slightly less than one and one half turns. Ends 23, 23' of clamping portion 22 have tangentially extended therefrom integral clamping levers 24, 25, which levers are acute angularly related to each other and have laterally and outwardly extended from their free ends U-shaped seats 26, 27 arranged in inverted position with respect to each other.

Clip 10, when used for attaching edge wire 9 to the sinuous loops 19, is slipped upon said edge wire and the curved portion 28 of a loop 19 until coiled clamping portion 22 fully encircles portion 28 and wire 9, then one of the seats 26, 27 of levers 24, 25 respectively is brought into engagement with one of the straight wire portion 29, 30 of the respective coil 19, and, finally, the seat of the remaining lever is forcibly brought opposite the respective straight wire portion of said coil and snapped into engagement with said wire portion. In this position of clip 10 clamping portion 22 tightly grips edge wire 9 and curved portion 28 of coil 19 and securely interlocks said edge wire with spring 3.

It is obvious, that spring clips of the type described above can readily be used for structures wherein coil-springs are grouped together within a steel wire frame forming the edge wire for the structure, as commonly practiced in present day upholstered furniture constructions. The use of yielding wire clips for such structures is shown in Fig. 6, in which figure a plurality of coil springs 31 are connected to an edge wire 32 by means of spring steel wire clips 33, principally constructed similar to clips 10 previously described with the exception that lever arms 34, 35 of said clips are more spread for engagement with the respective coils 36 of coil-springs 31.

Having thus described my invention what I claim is:

1. A connection for wire members in which a plurality of wire portions are arranged parallel and in close proximity to each other, a clip securing said wire portions together comprising a spring wire member having a coil portion at one end thereof, a resilient lever arm extending from said coil and slightly out of alignment with the plane thereof, and locking means extending transversely of the free end of said arm, the coil portion of said clip encircling all of said wire portions and being tilted to engage diametrically opposed portions of said coil with opposite sides of said wire portions, said lever arm lying alongside said wire portions and said locking means being engaged therebeneath to hold said lever arm in strained relation and said coil tightly gripping said wire portions.

2. A connection for wire members in which a plurality of wire portions are arranged parallel and in close proximity to each other, a clip securing said wire portions together comprising a spring wire member having an openly wound coil portion at one end thereof, a resilient lever arm extending from said coil slightly out of alignment with the plane thereof and in partly overlapping relation with respect thereto, and locking means extending transversely of the free end of said arm, the coil portion of said clip encircling all of said wire portions and tilted to engage diametrically opposed portions of said coil with opposite sides of said wire portions, said lever arm overlying and engaging the end of said coil to close said openly wound coil portion and lying alongside said wire portions and said locking means being engaged therebeneath to hold said lever arm in strained relation and in contact with said coil and said coil tightly gripping said wire portions.

WILLIAM H. NEELY.